(12) United States Patent
Kumar

(10) Patent No.: US 8,537,813 B2
(45) Date of Patent: *Sep. 17, 2013

(54) SUPPORTING BOTH PACKET AND CIRCUIT-BASED WIRELESS NETWORKS

(75) Inventor: Anil K. Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 13/031,356

(22) Filed: Feb. 21, 2011

(65) Prior Publication Data

US 2011/0141958 A1 Jun. 16, 2011

Related U.S. Application Data

(63) Continuation of application No. 09/918,244, filed on Jul. 30, 2001, now Pat. No. 7,920,554.

(51) Int. Cl.
*H04L 12/66* (2006.01)

(52) U.S. Cl.
USPC .................... 370/354; 370/328; 455/422.1

(58) Field of Classification Search
USPC ......... 370/352, 354, 429, 459, 463, 328–329; 455/452.1
See application file for complete search history.

(56) References Cited

U.S. PATENT DOCUMENTS

| | | | |
|---|---|---|---|
| 4,731,785 A | 3/1988 | Ferenc et al. | 370/537 |
| 5,533,019 A | 7/1996 | Jayapalan | 370/352 |
| 5,845,215 A | 12/1998 | Henry et al. | |
| 5,978,368 A | 11/1999 | Hjelm et al. | |
| 6,167,078 A | 12/2000 | Russo | |
| 6,212,641 B1 | 4/2001 | Frank et al. | |
| 6,272,129 B1 * | 8/2001 | Dynarski et al. | 370/356 |
| 6,314,300 B1 | 11/2001 | Nakashima et al. | 455/517 |
| 6,546,247 B1 | 4/2003 | Foti et al. | 455/433 |
| 6,594,253 B1 * | 7/2003 | Sallberg et al. | 370/349 |
| 6,717,928 B1 * | 4/2004 | Kalliokulju et al. | 370/335 |
| 6,728,208 B1 * | 4/2004 | Puuskari | 370/230.1 |
| 6,765,890 B1 | 7/2004 | Palat et al. | 370/331 |
| 7,230,934 B2 * | 6/2007 | Choi | 370/313 |

(Continued)

FOREIGN PATENT DOCUMENTS

| | | |
|---|---|---|
| EP | 0 899 977 A1 | 3/1999 |
| EP | 1 094 675 A1 | 4/2001 |

(Continued)

OTHER PUBLICATIONS

3$^{rd}$ Generation Partnership Project; Technical Specification Group Services and System Aspects; Description of Charge Advise Information (CAI), Tecnical Specification 3G TS 22.024 version 3.0.1, (Oct. 1999).

(Continued)

*Primary Examiner* — Kevin Mew
(74) *Attorney, Agent, or Firm* — Trop, Pruner & Hu, P.C.

(57) ABSTRACT

Middleware may accommodate both packet data and circuit data services in the same cellular telephone. A cellular telephone may travel between networks that are packet and circuit data service based. A protocol middleware may determine whether packet data services are available, and, if so, may determine the mobility management state of the system. Depending on the mobility management state of the system, inappropriate applications may be closed or suspended.

4 Claims, 2 Drawing Sheets

(56) References Cited

U.S. PATENT DOCUMENTS

| | | | | |
|---|---|---|---|---|
| 7,289,816 B2 * | 10/2007 | Mills | ............................. | 455/458 |
| 7,675,881 B2 * | 3/2010 | Verma et al. | .................. | 370/328 |
| 2001/0015963 A1 | 8/2001 | Tuomainen et al. | .......... | 370/311 |
| 2002/0085514 A1 | 7/2002 | Illidge et al. | .................. | 370/352 |

FOREIGN PATENT DOCUMENTS

| | | |
|---|---|---|
| EP | 1 107 626 A2 | 6/2001 |
| JP | 9-172430 | 6/1997 |
| JP | 2001-184149 | 7/2001 |
| WO | WO 98/57509 | 12/1998 |
| WO | WO 99/16266 | 4/1999 |
| WO | WO99/16266 | 4/1999 |
| WO | WO 99/17579 | 4/1999 |
| WO | WO 99/52306 | 10/1999 |
| WO | WO 00/45614 | 8/2000 |
| WO | WO 01/15468 A1 | 3/2001 |
| WO | WO 02/03733 A1 | 1/2002 |
| WO | WO 02/056625 A1 | 7/2002 |

OTHER PUBLICATIONS $3^{rd}$ Generation Partnership Project; Technical Specification Group Services and System Aspects; Advise of Charge (AoC) Supplementary Services—Stage 1, Technical Specification 3G TS 22.086 version 3.1.0 (Oct. 1999).

$3^{rd}$ Generatioin Partnership Project; Technical Specification Group Services and System Aspects; General Packet Radio Service (GPRS); Service description, Stage 1 (Release 1999), Technical Specification 3G TS 22.060 version 3.4.0 (Jun. 2000).

$3^{rd}$ Generation Partnership Project; Technical Specification Group Services and System Aspects; Vocabulary for 3GPP Specifications (Release 1999), Technical Report 3G TR 21.905, version 3.2.0 (Oct. 2000).

* cited by examiner

SUPPORTING BOTH PACKET AND CIRCUIT-BASED WIRELESS NETWORKS

CROSS-REFERENCE TO RELATED APPLICATIONS

This application is a continuation of U.S. patent application Ser. No. 09/918,244 now U.S. Pat. No. 7,920,554, filed on Jul. 30, 2001.

BACKGROUND

This application relates generally to cellular telephones.

Cellular telephone networks may be packet-based where information is divided into packets and transmitted in a packet-switched system. Alternatively, cellular telephone networks may be circuit-based or not packet-based.

In packet-based wireless networks, the user is generally charged based on the number of packets that are transmitted. Commonly in circuit-based wireless networks, the user is charged based on connection time.

Generally, cellular telephones are either packet-based or circuit-based, but not both. Some of the reasons for this are that packet-based systems utilize mobility management state information while circuit-based systems do not. Application programs in a given cellular telephone may be unable to discern when to apply packet-based protocols and when to apply circuit-based protocols. In addition, because charges are assessed based on packets in a packet-based network and time in a circuit-based network, it is difficult for conventional cellular telephones to determine how and when to accrue charges.

The 3GPP specification calls for a class A mode that supports both second generation (2G) and third generation (3G) services simultaneously. $3^{rd}$ Generation Partnership Project; General Packet Radio Service, Service description, Stage 1, (3GTS 22.060 Release 1999). However, the specification does not explain how to smoothly transition between 2G and 3G services.

For example, in third generation (2.5G or 3G) cellular telephone networks, three different mobility management states known as idle, standby and ready are available. A cellular telephone in the ready state is paged periodically to determine whether or not the cellular telephone is available and ready to receive phone calls. After the expiration of a time period without receiving a call (or under other circumstances), the telephone may be transitioned from the ready to the standby state. From the standby state, upon the expiry of a period of time without receiving any calls, the telephone may be transitioned to the idle state.

In the ready state, the phone is ready to receive calls. It is periodically paged in accordance with appropriate page messaging protocol. The standby state involves less paging. Generally, the cellular telephone is in a larger area with a plurality of cells and is paged less often than in the ready state. The least paging is done in the idle state.

Thus, an application running on a cellular telephone that operates both in third generation (2.5G or 3G) and second generation (2G) systems, must be able to handle the different circumstances that arise because of the mobility management states when (and only when) the system is in a third generation or packet-switched environment. The rest of the time the extra constraints raised by mobility management states may be ignored.

Thus, there is a need for a way to transition between circuit-based and packet-based systems in the same cellular telephone without user interaction.

DETAILED DESCRIPTION

Figure 1:
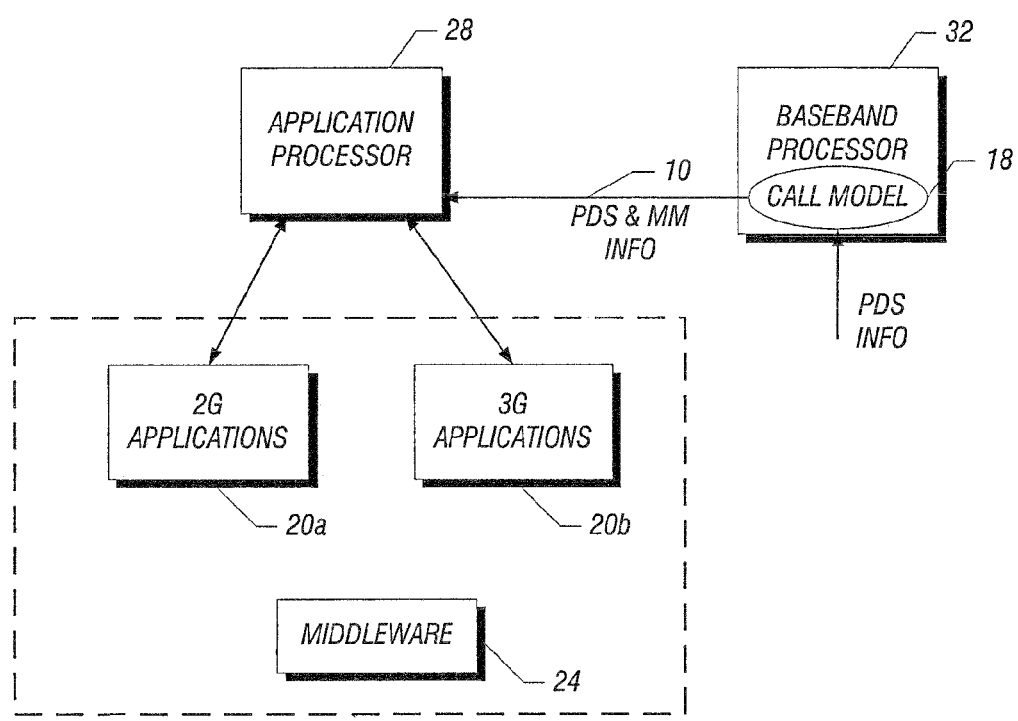
FIG. 1 is a schematic depiction of one embodiment of the present invention.

Referring to FIG. 1, a cellular telephone may be applicable to both second generation circuit-switched networks and third generation packet-switched networks. The cellular telephone or mobile subscriber shown in FIG. 1 may include an application processor 28 coupled to a baseband processor 32. Basically, the baseband processor 32 handles call implementation functions and the application processor 28 handles all other functions.

A call model 18 provided with the baseband processor 32 contains a set of cooperating services that work together to process a call. The call model 18 implementation supports basic call functions such as session management including call setup, modification and tear down as well as mobility management. Since the services offered by networks vary widely, the call model 18 functionality allows multi-mode terminal implementation that is both modular and scalable as long as all access protocols adhere to a pre-defined protocol application program interface (API) described herein and all applications supporting different access protocols adhere to the protocol API.

The call model 18 residing on the baseband processor 32 supports both circuit data service (CDS) and packet data service (PDS) through a protocol API. The call model 18 provides PDS availability information as well as mobility management (MM) state information to the application processor 28 as indicated at 10, for example, through a baseband protocol API. The application execution environment uses this information to open, suspend, or close the wireless PDS applications.

The mobility management information provided by the call model 18 includes mobility management state as well as roaming information. The application execution environment checks the mobility management state before allowing the mobile subscriber to open new PDS applications. The application execution environment can be part of a protocol API or middleware 24 residing between the baseband processor 32 and the application processor 28.

As a result, the application processor 28 can handle applications or programs 20a relating to 2G implementations as well as applications 20b related to 3G or 2.5G implementations. This is despite the fact that 2.5G and 3G applications and 2G applications may involve considerably different parameters. Again, 2G applications do not generally involve mobility management state information and use time-based charges while packet-based systems use mobility management state and must contend with idle, ready and standby mobility management states and charge based on numbers of packets.

Figure 2:
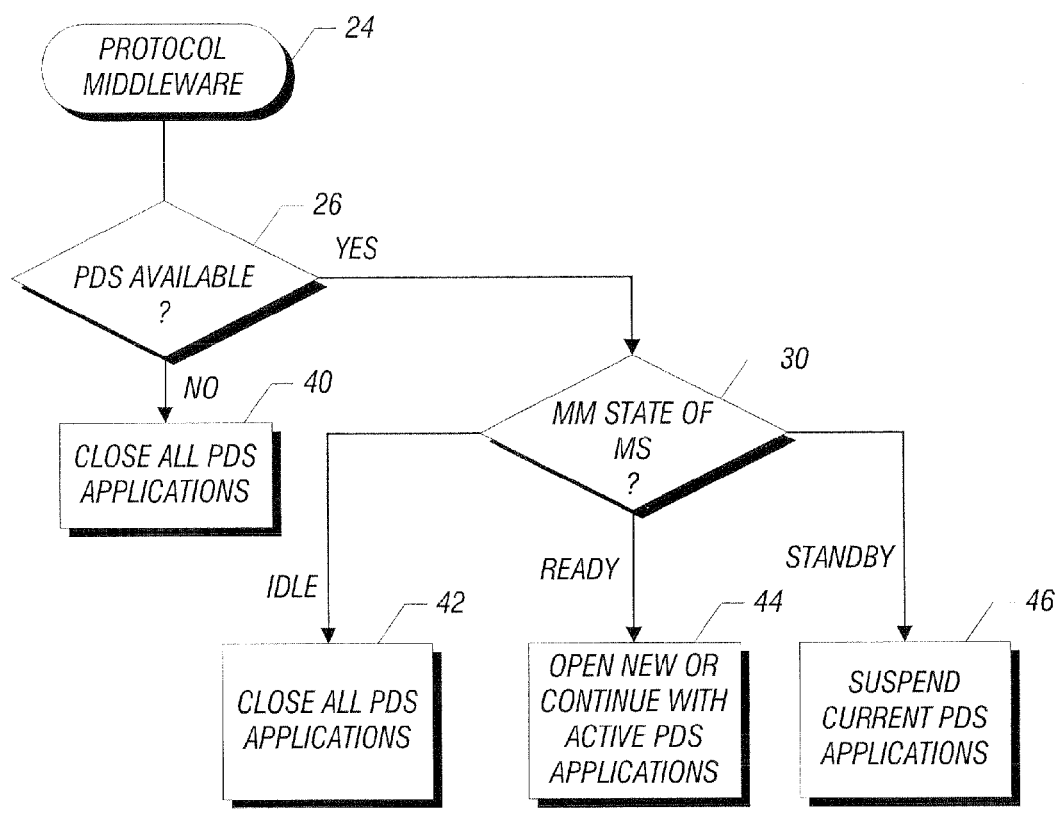
FIG. 2 is a flow chart in accordance with one embodiment of the present invention.

Thus, referring to FIG. 2, the protocol middleware 24 initially determines whether PDS is currently available to the mobile subscriber as indicated in diamond 26. If not, all PDS applications are automatically closed as indicated in block 40.

Closing applications in this circumstance may reduce the likelihood of erroneous results or crashes in some embodiments.

If PDS is currently available, the mobility management state of the mobile subscriber is determined as indicated in diamond 30. If the mobile subscriber is in the idle state, all PDS applications are closed as indicated in block 42. Similarly, if the mobile subscriber is in the ready state, new PDS applications are opened or active PDS applications may be continued as indicated in block 44. Finally, if the mobile subscriber is in the standby state, all PDS applications currently operating are suspended upon transition to standby as indicated in block 46.

Thus, in accordance with embodiments of the present invention, the application execution environment may be automatically controlled without user interaction to support wireless networks based on either circuit or packet data service. This method of managing the application execution environment may increase the battery life of the packet-based cellular telephone in some embodiments. Embodiments of the present invention may be used in 2.5G and 3G packet-based mobile terminals irrespective of what type of air interface is utilized.

As a result, in some embodiments, the application environment may suspend or shut down high data rate applications when the mobile subscriber is in a 2G network without degrading the performance of other applications. Similarly, when packet data service applications are applicable, the mobility management state of the system may be determined and used to handle applications appropriately.

While the middleware 24 is illustrated as residing on or being associated with the application processor 28 alternatively it may reside on or be associated with the baseband processor 32. As still another embodiment, portions of the middleware 24 may reside on or be associated with each of said application and baseband processors 28 and 32. In still other embodiments, the baseband and application processor functionalities may be accomplished in a single integrated circuit.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer readable medium storing instructions that enable a processor-based system to:
   if the mobile subscriber is in a packet data service network, determine the mobility management state of the mobile subscriber; and
   automatically close packet data service application software if the mobility management state is idle.

2. The medium of claim 1, further storing instructions that enable the processor-based system to continue processing active packet data service applications if the mobility management state is ready.

3. The medium of claim 1, further storing instructions that enable the processor-based system to suspend current packet data service applications if the mobile subscriber is in the standby state.

4. The medium of claim 1, further storing instructions that enable the processor-based system to automatically close all packet data service applications if the mobile subscriber is in a circuit data service network.

* * * * *